(12) United States Patent
McCutchen et al.

(10) Patent No.: US 9,011,646 B2
(45) Date of Patent: Apr. 21, 2015

(54) MECHANICAL PYROLYSIS IN A SHEAR RETORT

(75) Inventors: Wilmot H. McCutchen, Orinda, CA (US); David J. McCutchen, Portland, OR (US)

(73) Assignee: McCutchen Co., Portland, OR (US)

(*) Notice: Subject to any disclaimer, the term of this patent is extended or adjusted under 35 U.S.C. 154(b) by 1110 days.

(21) Appl. No.: 13/016,328

(22) Filed: Jan. 28, 2011

(65) Prior Publication Data

US 2012/0193271 A1    Aug. 2, 2012

(51) Int. Cl.
| | |
|---|---|
| B01D 3/00 | (2006.01) |
| C10B 53/06 | (2006.01) |
| C05F 11/02 | (2006.01) |
| C10B 55/00 | (2006.01) |
| C10G 1/04 | (2006.01) |
| C22B 3/02 | (2006.01) |

(52) U.S. Cl.
CPC .............. *C10B 53/06* (2013.01); *C05F 11/02* (2013.01); *C10B 55/00* (2013.01); *C10G 1/04* (2013.01); *C22B 3/02* (2013.01)

(58) Field of Classification Search
USPC .......... 202/265, 270; 210/512.3; 96/175, 182, 96/196, 216, 219; 261/5, 84
See application file for complete search history.

(56) References Cited

U.S. PATENT DOCUMENTS

| | | | |
|---|---|---|---|
| 269,667 A | 12/1882 | Heberle | |
| 324,363 A | 8/1885 | Cogswell | |
| 1,682,128 A | 8/1928 | Iglehart | |
| 1,901,170 A | 3/1933 | Karrick | |
| 2,751,157 A | 6/1956 | Meyer et al. | |
| 3,498,454 A | 3/1970 | Timson | |
| 3,523,071 A | 8/1970 | Knapp | |
| 3,685,747 A | 8/1972 | Horstman | |
| 3,731,800 A | 5/1973 | Timson | |
| 3,941,423 A * | 3/1976 | Garte | 299/8 |
| 4,039,152 A | 8/1977 | Peterson | |

(Continued)

FOREIGN PATENT DOCUMENTS

CN         101768489         7/2010

OTHER PUBLICATIONS

J. Chrones, and R.R. Germain, Bitumen and Heavy Oil Upgrading in Canada, Petroleum Science and Technology, 1989, pp. 783-821, vol. 7, Issue 5.

(Continued)

*Primary Examiner* — Nina Bhat
(74) *Attorney, Agent, or Firm* — Marger Johnson & McCollom PC

(57) ABSTRACT

Mechanical visbreaking and pyrolysis between counter-rotating coaxial centrifugal impellers in a continuous radial counterflow process minimizes wastewater discharges. In one example, a cataclastic shear retort comminutes, shear thins, and shear heats an axial feed, such as tar sand, oil shale, coal tailings, distillation bottoms, or lignite. Pyrolyzing the feedstock in this shear retort yields a product stream of gases, naphthas, and oils which first mixes with the feedstock and then is axially extracted, while spent solids are simultaneously extruded from the periphery as coked devolatilized residue, such as char sand for upgrading soil to terra preta. Recirculation of shear-heated solids in long residence time within the shear retort brings heat from the spent solids at the periphery to the feedstock without an external heated sand loop. $CO_2$ emissions from combustion to heat water for oil extraction are eliminated.

11 Claims, 6 Drawing Sheets

(56) References Cited

U.S. PATENT DOCUMENTS

| | | | |
|---|---|---|---|
| 4,105,536 | A | 8/1978 | Morrell |
| 4,234,232 | A | 11/1980 | Smith et al. |
| 4,264,104 | A | 4/1981 | Helvenston et al. |
| 4,409,090 | A | 10/1983 | Hanson et al. |
| 4,414,001 | A | 11/1983 | Kunii |
| 4,477,331 | A | 10/1984 | Reed et al. |
| 4,481,099 | A | 11/1984 | Mitchell |
| 4,498,706 | A | 2/1985 | Ilardi et al. |
| 4,563,246 | A | 1/1986 | Reed et al. |
| 5,000,389 | A | 3/1991 | So et al. |
| 5,320,746 | A | 6/1994 | Green et al. |
| 5,626,647 | A | 5/1997 | Kohr |
| 5,985,221 | A | 11/1999 | Knecht |
| 6,270,630 | B1 | 8/2001 | Xing |
| 6,651,914 | B1 | 11/2003 | Langenecker |
| 6,653,517 | B2 | 11/2003 | Bullock |
| 7,128,286 | B2 | 10/2006 | Chaney et al. |
| 7,210,642 | B2 | 5/2007 | Cook et al |
| 7,270,743 | B2 | 9/2007 | Freel et al. |
| 7,448,692 | B2 * | 11/2008 | Drake et al. .............. 299/8 |
| 7,757,866 | B2 * | 7/2010 | McCutchen .............. 210/512.3 |
| 8,475,616 | B2 * | 7/2013 | McCutchen .............. 156/158 |
| 2006/0021915 | A1 | 2/2006 | Bjornson et al. |
| 2006/0280669 | A1 | 12/2006 | Jones |
| 2007/0089785 | A1 | 4/2007 | Perry |
| 2007/0209972 | A1 | 9/2007 | Crichlow |
| 2008/0203809 | A1 | 8/2008 | Day |
| 2009/0159461 | A1 | 6/2009 | McCutchen et al. |
| 2010/0096298 | A1 | 4/2010 | de Mayo |

OTHER PUBLICATIONS

C. Grant, S. Sarkar, and C.R. Phillips, Mechanical Upgrading of Athabasca Oil Sands in a Rotating Contactor, Industrial and Engineering Chemistry Process Design and Development, 1980, pp. 185-189, vol. 19, Issue 1.

K.M. Jayakar, et al., Thermal Recovery of Oil from Tar Sands by an Energy-Efficient Process, Oil Shale, Tar Sands, and Related Materials, Sep. 3, 1981, pp. 359-368.

A.M. McKay and C.R. Phillips, Fundamentals of Mechanical Upgrading of Athabasca Oil Sands: Mechanisms of Sand and Bitumen Separation, Separation Science and Technology, 1981, pp. 237-252, vol. 16, Issue 3.

K. Mair and C. Marone, Shear Heating in Granular Layers, Pure and Applied Geophysics, 2000, pp. 1847-1866, vol. 157.

J. Maybury, Investigation of the Stress Induced Properties of Coke during Carbonization, A Thesis submitted to the College of Engineering and Mineral Resources at West Virginia University, 2007.

R.H. Venderbosch, Fast Pyrolysis Technology Development, Biofuels, Bioproducts and Biorefining, 2010, pp. 178-208, vol. 4.

W.C. Park, et al., Determination of Pyrolysis Temperature for Charring Materials, Dec. 2007, 28 pages.

P.J. Zandbergen and D. Dijkstra, Von Karman Swirling Flows, Annual Review of Fluid Mechanics, 1987, pp. 465-491, vol. 19.

V. Shtern and F. Hussain, Collapse, Symmetry Breaking, and Hysteresis in Swirling Flows, Annual Review of Fluid Mechanics, 1999, pp. 537-566, vol. 31.

J. Chen, et al., Fractal-like Tree Networks Increasing the Permeability, Physical Review E, 2007, 8 pages, vol. 75, Issue 5.

A. de la Torre and J. Burguete, Slow Dynamics in a Turbulent von Karman Swirling Flow, Physical Review Letters, 2007, 4 pages, vol. 99, Issue 5.

U.S. Environmental Protection Agency, Study of Selected Petroleum Refining Residuals, Aug. 1996, 60 pages.

S. Poncet, R. Schiestel, and R. Monchaux, Turbulent Von Karman Flow Between Two Counter-Rotating Disks, Proceedings of the 8th International Symposium on Experimental and Computational Aerothermodynamics of Internal Flows, Jul. 2007, 10 pages, Lyon, France.

S. Poncet, R. Schiestel, and R. Monchaux, Turbulent Von Karman Swirling Flows, Advances in Turbulence XI, 2007, pp. 547-549, vol. 117.

Extended European Search Report for related European Patent Application No. 11745461.1, dated Dec. 10, 2013, EPO Patent Office, The Hague, 6 pages.

International Preliminary Report on Patentability for related International Application No. PCT/US2011/041284, dated Aug. 8, 2013, International Bureau of WIPO, Geneva, Switzerland, 6 pages.

* cited by examiner

Radial counterflow in the workspace

MECHANICAL PYROLYSIS IN A SHEAR RETORT

TECHNICAL FIELD

The present disclosure relates to double disk mills, means for visbreaking, and means for extracting oils and other hydrocarbon products from tar sands, oil shale, lignite, coal tailings, and other unconventional oil source materials.

BACKGROUND

Oil shale, tar sands (also called oil sands), extra heavy oil, distillation bottoms, coal tailings, and lignite (a group which collectively will be referred to as "unconventional oil source materials" herein) offer a resource for meeting the world's demand for hydrocarbons as conventional, low viscosity petroleum runs out. High viscosity and a heavy burden of mineral solids such as sand and clay have made unconventional oil source material difficult to process. Conventional methods of oil extraction can carry a high environmental cost on two accounts: $CO_2$ from the natural gas burned to heat the water for extraction, and water pollution from the discharge of the residue, liquid and solid, from processing.

Capturing and sequestering $CO_2$ emissions (CCS) from tar sands processing (which are half of all of Canada's $CO_2$ emissions) is not feasible at the scale required, given the present state of the art of CCS. Recent reports of leaks in Canadian sequestration projects, and the huge water requirements of chemical $CO_2$ capture, make the need for an alternative to the hot water extraction method of tar sands processing imperative.

Tailings ponds (sludge ponds) from conventional oil extraction are a growing toxic dump covering over fifty square kilometers in the boreal forest of Alberta, Canada, a blight now easily visible from space. Six barrels of aqueous tailings are produced for each barrel of oil extracted from the Athabasca tar sand. These tailings ponds are mostly a gravy-like thick suspension of fines, which will not settle. The top layer of clear water is poisoned by naphthenic acids, which are deadly to migrating waterfowl which land in the sludge ponds. The conventional means for addressing the bird kill problem is to try to frighten the birds when they approach. Water pollution from sludge ponds also poses a health risk to humans because the poisons migrate into the water supply.

After 40 years, as of 2007 no reclamation certificate for a sludge pond had been issued by the government of Alberta. Despite public clamor, there is no effective remediation plan in place for the sludge ponds, so the first task is to prevent them from getting worse. The need is clear for an alternative to the heavy consumption of fresh water involved in current extraction methods. For a description of the wasteful conventional art, see Chrones, et al. "Bitumen and Heavy Oil Upgrading in Canada," *Petroleum Science and Technology*, 7:5, 783-821 (1989).

Naphthas are the petroleum fraction having a boiling point below 200° C. Oils are higher boiling point products. Naphthenic acids poison the sludge ponds because devolatilization of the residual solids is incomplete. Injected steam will quickly lose enthalpy uselessly heating the water and solids which are associated with the desired hydrocarbons, so devolatilization of the residue is incomplete due to the inherent limitations of any steam extraction process.

Shear thinning, or mechanical reduction of viscosity, is a well-known phenomenon in rheology. Visbreaking, or thermal reduction of viscosity, is conventionally practiced by heat transfer from external fuel combustion. Heat transfer is either quickly (coil-type) or slowly (soaker) in a vessel which contains the material. Rotating the vessel to tumble the feedstock is known to the art.

Possible mechanical visbreaking was observed in the small batch experiment reported in McKay, et al. "Fundamentals of Mechanical Upgrading of Athabasca Oil Sands: Mechanisms of Sand and Bitumen Separation," *Separation Science and Technology*, 16:3, 237-252 (1981), but the authors did not follow up or claim such a result.

The composition of tar sands typically is 85% silica sand, clay, and silt, 5% water, and 10% bitumen. The average grain size of the sand is 0.5 mm diameter, and 1.5-20% of the sand is free of bitumen. Sand density is 2.65 $g/cm^3$ and bitumen is 1.01 $g/cm^3$ The intrinsic water content of tar sands is an unexploited resource, and the present disclosure is directed to using this intrinsic water content instead of water withdrawals from the environment to generate hot water for oil extraction.

The conventional method for oil extraction from tar sand is the Clark Hot Water Extraction (CHWE) process developed nearly a century ago. Excavated tar sand is comminuted for size reduction and hot water at 50-80° C. is added, resulting in a slurry out of which bitumen is separated as a froth comprising 60% bitumen, 30% water, and 10% solids by weight. Approximately 70 weight percent (83.5 volume percent) of the bitumen in the ore is recovered as synthetic crude.

Separating bitumen from the sand by mechanical means has not progressed in the 30 years since the pioneering research in the field. See McKay, et al. "Fundamentals of Mechanical Upgrading of Athabasca Oil Sands: Mechanisms of Sand and Bitumen Separation," *Separation Science and Technology*, 16:3, 237-252 (1981), and Grant, et al. "Mechanical Upgrading of Athabasca Tar Sands in a Rotating Contactor," *Ind. Eng. Chem. Process Des. Dev.*, 19:1, 185-189 (1980). These batch experimental devices used a rotor-stator mill in a cold water process to chip off bitumen to produce free sand, and shear heating of the bitumen to the point of adhesion with the stator was dismissed as an unwanted experimental artifact. The upgrading in the prior art occurs prior to retorting.

Thermal recovery processes heat the separated bitumen froth in a retort to processing temperatures of 450-550° C. and extract from the retort a product stream comprising gases, naphthas (boiling point below 200° C.), and oils. Solids in the froth drop out of the retort and are further heated to about 550-600° C. by combustion of their residual carbonaceous compounds during a combustion step in a sand loop outside of the retort. Recycling the hot sand from the sand loop into the retort supplies heat for the pyrolysis step.

Oil shale, like tar sand, has a heavy burden of mineral solids. Kerogens (solid high molecular weight hydrocarbons in the sedimentary rock) have high boiling points and the mineral solids and water associated with the kerogens in the oil shale deposit act as parasitic heat sinks, making in situ steam extraction difficult.

Coal tailings are a mixture of coal and minerals which may result from mining of the various grades of coal, such as anthracite, bituminous coal, and lignite. Lignite is a low-grade coal comprising a high mineral content. Slag from combustion of lignite is collected in ash ponds, which are a growing blight near coal-fired power plants. Transportation of lignite to the coal plants is wasteful to the extent that minerals are being transported as well as hydrocarbons. Extracting oil or syngas from the lignite near the mine would save on transportation costs and avoid the ash pond problem.

Char mixed with soil is called terra preta. Long experience with terra preta in the Amazon proves that biochar is excellent for agriculture. Completing the pyrolysis of tar sands for complete residue conversion would make the residue of tar sands oil extraction a beneficial product instead of toxic waste.

The present disclosure is directed to the long-felt but unmet need for a continuous and low-tech method for making char sands from tar sands, without $CO_2$ emissions from heating water or burning residue, and with minimal wastewater discharges to the environment.

Other uses for the disclosure will be obvious to the skilled practitioner, including the processing of other feedstocks where mineral burden interferes with the proper extraction of the product, such as ore processing in other mining operations.

SUMMARY

Continuous mechanical pyrolysis and visbreaking is practiced in a cataclastic shear retort for low-cost upgrading of unconventional oil source material. Peripheral drive wheels turn coaxial impellers in counter-rotation about a common axis, thereby coupling the work energy from a prime mover into the feedstock in a workspace between the impellers. This continuous process can be in situ, as part of the mining operation, or ex situ.

The intrinsic water content in the feedstock is heated to steam in the shear retort. The steam is confined in the workspace, and steam pressure drives a sink flow of a product stream through a shear layer in the workspace. Shear-heated solids gradually migrate radially outward between the impellers during a long residence time to eventual extrusion at the periphery of the workspace in the shear retort as thoroughly devolatilized spent solids, which can be called char sand. Axial extraction of a product stream (gases, naphthas, and oils) occurs simultaneously with said peripheral extrusion of spent solids.

The mutual abrading of the sand and clay particles in the confined and oxygen-starved space between the impellers chips the bitumen from the solids. Stretching of the viscous feedstock in the shear layer between the impellers reduces its viscosity. Shear heating of the solids pyrolyzes the feedstock. Shear heated solids churn in recirculating flow back toward the axis of rotation and thus bring heat from the periphery of the shear retort back to the feedstock without an external sand loop. Complete pyrolysis leaves a coked residue in the processed solids eventually extruded at the periphery of the shear retort, which are benign char sands.

Radial vortices in a shear layer between the coaxial counter-rotating impellers provide a sink flow pathway for continuous axial extraction of a product stream of gases, naphthas, and oils through an axial exhaust port. Scissoring vanes on the impellers impart periodically refreshed lines of high vorticity to the shear layer and thereby sustain the radial vortices for the sink flow of the product stream.

Peripheral drive wheels engage the impellers at their periphery and cause their counter-rotation. The prime mover for the peripheral drive wheels could be a wind turbine, making the process benign for $CO_2$ as well as for water.

While this disclosure is directed most particularly toward the processing of tar sands, it will be easily appreciated how it can be applied to visbreaking, cracking, and gasification of other unconventional oil source materials, such as oil shale, coal tailings, lignite, distillation bottoms, and heavy crude. It also has use in the processing of metal ores, where a solvent can be introduced when the ore is ground, and the heat and pulverization improves the liquid extraction of the metallic components in an axial flow, while the waste rock is extruded at the periphery.

DRAWING REFERENCE NUMERALS

1—feedstock
2—radial vortex axis
3—axial feed conduit
4—axial feed port
5—radial vane
5a—radial vane on opposing disk impeller
6—bottom disk impeller
7—top disk impeller
8—prime mover
9—peripheral drive wheel
10—common axis of rotation of the counter-rotating impellers
11—workspace between the impellers
12—periphery of the workspace
13—support wheel
14—sleeper wheel
15—axial exhaust port
16—axial exhaust pump
17—drive track
18—char sand collection funnel
19—char sand collection
20—central plane of workspace
21—ground plane

DETAILED DESCRIPTION

Figure 1:
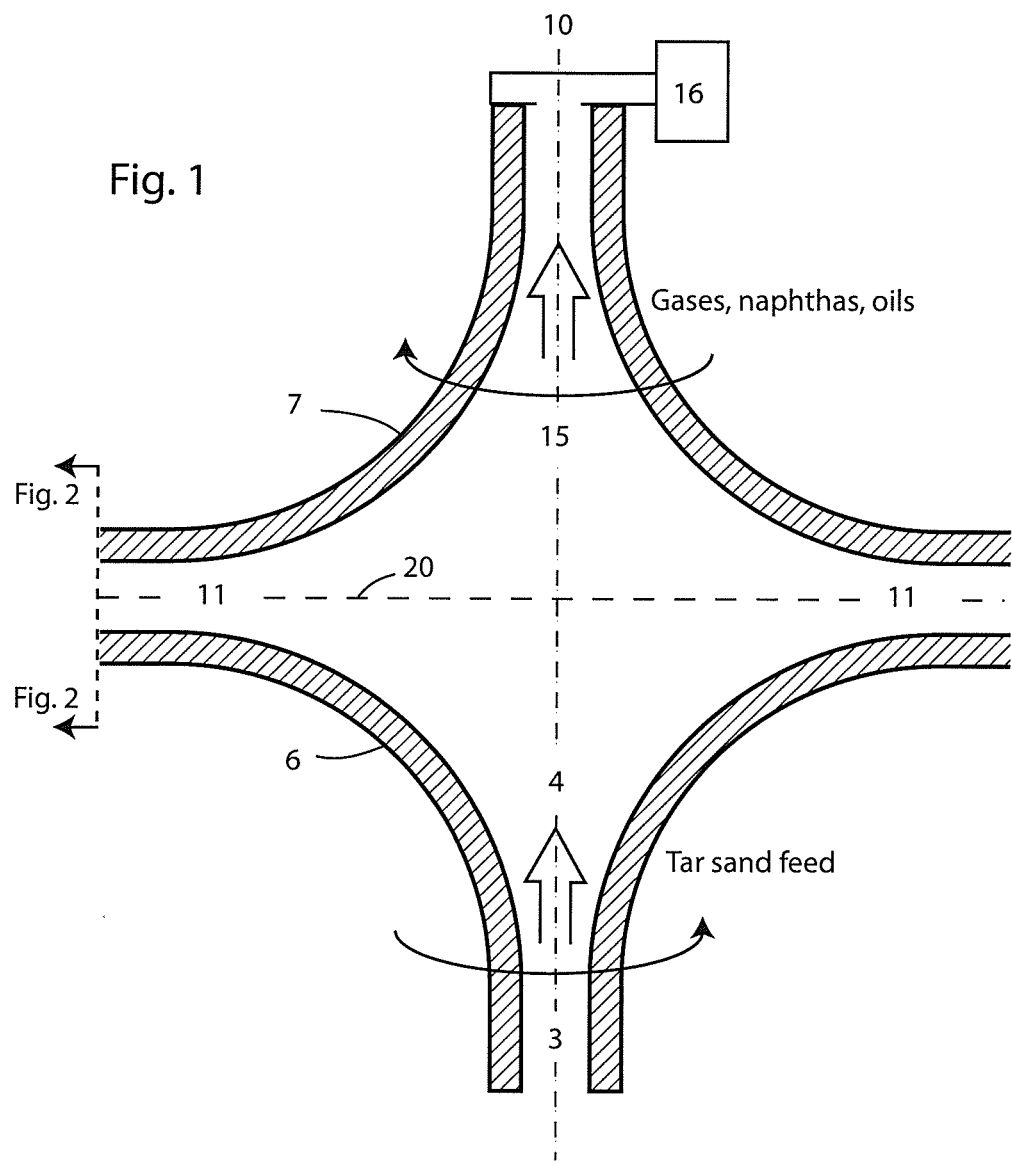
FIG. 1 shows a detail cross-section elevational view of the central portion of a shear retort for tar sands.

The cataclastic shear retort shown in FIG. 1 is a visbreaking, coking and devolatilizing reactor for processing tar sends to make them benign char sands, while at the same time axially extracting gases, naphthas and oils from the bitumen, in a continuous process. It is a double disk mill having simultaneous peripheral output of spent solids and axial output of a product stream, said streams diverging from an axial input. The product stream may include products of gasification in other applications, but here discussion will focus on pipelineable fluid from tar sand.

The feedstock (which may be lignite, oil shale, tar sand, coal tailings, distillation bottoms, or other low-grade hydrocarbon sources burdened by mineral solids, which will be collectively referred to herein as "unconventional oil source materials") is mechanically pyrolyzed by momentum diffusion from counter-rotating coaxial centrifugal impellers as it is churned in the workspace 11 between the impellers. It will be appreciated by the skilled practitioner that this illustrative example of the continuous process for mechanical pyrolysis disclosed herein may be suitable for the solution of other types of problems and is not meant to preclude any modified design to suit a particular purpose. For example, the feedstock could be residual solids from conventional tar sands processing, where the problem would be devolatilizing the spent solids left behind by hot water extraction before they are discharged into the environment.

FIG. 1 shows a cross-section of the central portion of a cataclastic shear retort illustrating principles of this disclosure for the purpose of processing a feedstock of tar sand at a mine site so as to produce a pumpable product stream which may be pipelined away from the mine site, leaving behind at the mine site thoroughly devolatilized mineral solids.

Figure 2:
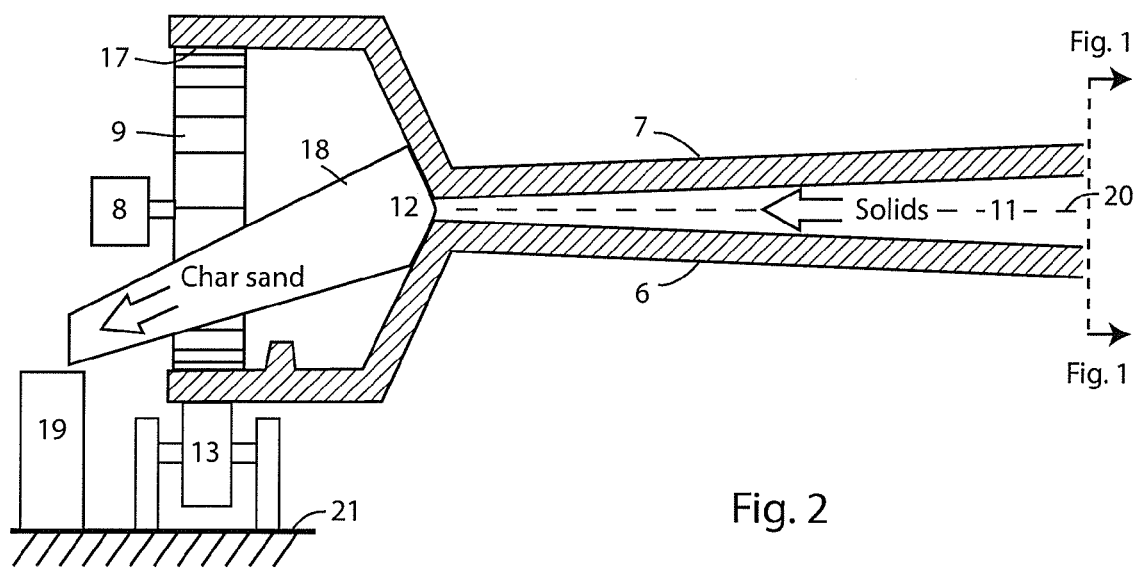
FIG. 2 connects to FIG. 1, showing a peripheral drive wheel.

FIG. 2 connects at the dotted line as shown.

Centrifugal impellers 6, 7 are counter-rotatable about a common axis of rotation 10. Both impellers have axial support structures including bearings and seals (not shown). One impeller, here the bottom impeller 6, has a central axial feed port 4 and the other impeller, here the top impeller 7, has a central axial exhaust port 15. A feedstock 1 comprising unconventional oil source material (here tar sand, which is also known as oil sand) is introduced through the axial feed port 4 into a workspace 11 between the impellers 6, 7 by suitable means, for example a pitch or screw conveyor. The workspace 11 extends radially from the axis 10 to a periphery 12.

Counter-rotation of the closely spaced apart impellers about the axis 10 shears and couples mechanical energy into the feedstock for pyrolysis. Friction causes shear heating of the solids and of the bitumen in the tar sand. Radial counter-flow in the workspace 11 (see FIG. 3) results in continuous and simultaneous extrusion of devolatilized solids through the periphery 12 of the workspace and axial extraction of a product stream (here comprising gases, naphthas, and oils) out of the workspace through the axial exhaust port 15. The outgoing product stream mixes with the incoming feedstock and helps act as a solvent for the bitumen.

The impellers 6, 7 comprise arrays of radial vanes 5, 5a (see FIG. 5) which push the feedstock radially outward to the periphery 12 as the impellers counter-rotate about their common axis of rotation 10. The vanes of each impeller serve to push the material in the spaces between the vanes of the opposite impeller radially outward toward the periphery 12 as the impellers counter-rotate about the axis 10.

Laminar boundary layers rotating along with the impellers 6,7 grind together at a shear layer to frictionally heat the feedstock and its water content. Sand density is 2.65 g/cm$^3$ and bitumen is 1.01 g/cm$^3$ so centrifugation by radial vortices 2 in the shear layer will concentrate the spent solids away from the shear layer and in the boundary layers. Bitumen and the gases and liquids of the product stream concentrate in the cores of the radial vortices 2 of the shear layer because of their low density.

An axial exhaust pump 16 assists in the extraction of the product stream and provides means for regulating the flow of the product stream out of the workspace so as to maintain a desired pressure within the shear retort. The axial exhaust pump 16 communicates with a pipeline (not shown) taking the product stream to further refining by suitable means known to the art.

Steam pressure resulting from frictional heating in the shear retort assists in axial extraction of the product stream. The workspace 11 between the shearing disk impellers tapers to narrow separation toward the periphery 12 of the impellers (see FIG. 2), thereby confining the shear heated tar sand and the steam. Additional water from the environment may be added to the feedstock as required. Additional sand, gravel, or other comminution-assisting material known to the art of ball mills may also be supplied to the workspace 11.

The axially extracted product stream enters a pipeline (not shown) through which it is conveyed to refining by suitable means known to the art. The product stream will be low in water and solids and rich in naphthas and oils.

Figure 6:
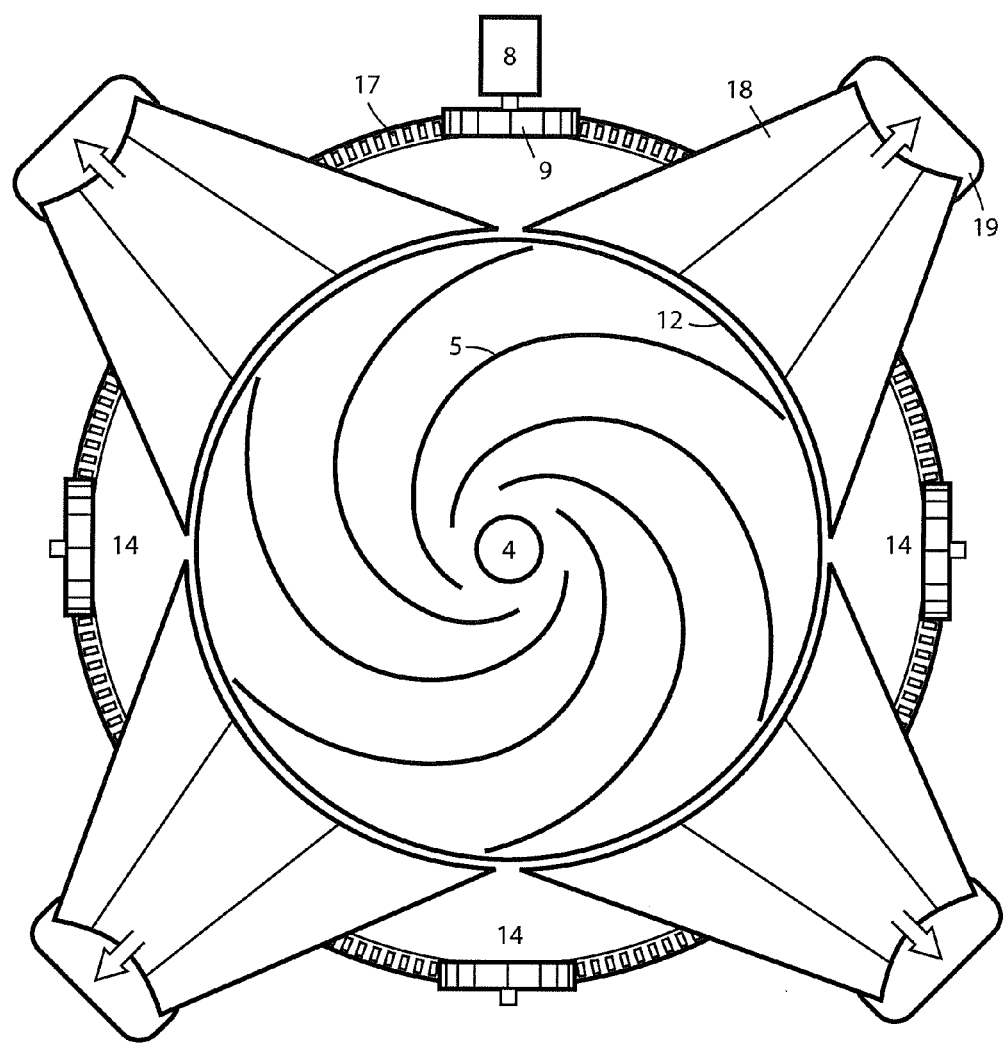
FIG. 6 shows the arrangement of drive wheels and sleeper wheels about the periphery of the retort.

Devolatilized solids extrude through the periphery 12. Char sand collection funnels 18 are disposed between the peripheral drive wheels, as shown in FIG. 6. The wide end of each funnel engages the impellers and directs the extruded solids emerging from the periphery 12 away from the peripheral drive wheels and into char sand collection means 19. Preferably, the bottom impeller 6 comprises apertures between its drive track 17 and the periphery 12, such that any char sand which may evade the funnels may drop through the apertures before reaching the peripheral drive wheels.

The shear-heated solids recirculate heat into the feedstock as they churn and migrate toward the periphery of the workspace 12. The accumulated heat in the solids during their churning residence time thoroughly devolatilizes any residual bitumen. Residence time for solids in the cataclastic shear retort can be increased to whatever is required for thorough devolatilizing of the residue by increasing the impeller diameter, by narrowing the separation of the impellers, and by other means known to the art. The retained volume of the workspace 11 is large enough relative to the mass flow through the axial exhaust port 15 and the periphery 12 such that residence time in the shear retort is sufficient for complete devolatilization of the residue at the given rotation speed and feed flow. The required cracking energy for pyrolysis is supplied by mechanical means over a sufficient residence time.

For example, a shear retort actuated by a prime mover having a power of 100 kW and having a retained volume of 20 m$^3$ and a feed rate of 1 m$^3$/s, will have a residence time of 20 seconds. The energy transferred to this 1 cubic meter of feedstock during those 20 seconds at 100 kW is 2 MJ. Increasing the retained volume (e.g. by increasing the diameter of the impellers) to 30 m$^3$ while keeping the same char sand extrusion rate would make the residence time 30 seconds and the energy transfer 3 MJ. Choking the extrusion at the periphery and the product flow through the axial exhaust port 15 to reduce the feed rate would also serve to increase the residence time, and hence the energy transfer to the tar sand feedstock for complete devolatilization of the solids. The correct process parameters for a given unconventional oil source material may be determined by those skilled in the art using these rudimentary principles.

Mixing biomass, such as agricultural waste or wood chips, with the hot char sand, either post-extrusion or by introducing biomass into the workspace 11, would serve to cool down the char sand and boost its char content for use as terra preta. Subsequent inoculation of the cooled char sand with mycorrhizal fungi would make the char sand even more effective as a soil additive—a resource instead of a toxic product to blight the environment. The tailings from this continuous extraction process would be dry and not mixed with voluminous and polluted water. The energy for visbreaking and extraction and devolatilization is provided by mechanical means. Preferably, wind power could be coupled into the feed, making this a carbon-neutral continuous process for upgrading unconventional oil source materials.

FIG. 2 connects to FIG. 1 as shown. The apparatus is axisymmetric about the axis 10. A prime mover 8 turns at least one peripheral drive wheel 9 engaging the edges of the impellers 6, 7 thereby causing them to exactly counter-rotate. The prime mover 8 might be a motor or engine, or another source of motive power such as a water or wind turbine. Preferably, redundant prime movers are connected to the impellers, so that if one fails, the others can supply enough power to prevent the shear retort from stalling. Alternative means for counter-rotation of the impellers could include separate prime movers for each impeller. Exact counter-rotation is shown here, but counter-rotation can also include the case where one impeller rotates and the other is static or is dragged along by feed viscosity to co-rotate at a lower speed, without being separately driven. Counter-rotation includes all cases where the impellers rotate relative to each other, i.e. cases other than exact co-rotation.

The peripheral drive wheel 9 is preferably a gear comprising cogs which engage a drive track 17. Support wheels such as at 13 contacting the opposite side of the disk impeller from the drive track 17 help to maintain a consistent engagement of the drive wheel 9 with the drive track 17. The impellers 6, 7 are preferably massive and act as heat reservoirs and flywheels for energy storage, thus allowing for the shear retort to operate continuously regardless of varying feed flow. Insulation added to the outer surfaces of the impellers would help retain heat within the shear retort.

Thoroughly devolatilized tar sand, or "char sand," is extruded at the periphery 12 and collected by suitable means such as a char sand collection funnel 18, leading to char sand collection 19. See also FIG. 6. The flow out of the periphery 12 and the flow out of the axial exhaust port 15 are simultaneous with the flow of feedstock through the axial feed port 4.

As shown in FIG. 1 and FIG. 2, the disk impellers define a planar workspace 11 that is bisected by a central plane 20 between the axial feed port 4 and the axial exhaust port 15, the central plane also bisecting the gap at the periphery 12. The central plane 20 is approximately parallel to the ground plane 21 supporting the shear retort. Alternatively, the workspace might be conical, having a central point on the axis of rotation 10 that is either above or below the level of the periphery 12. For example, impellers which define a conical workspace, with a central point higher than the periphery, would make use of the natural tendency of gases and liquids to rise and mineral solids to sink, so as to amplify the simultaneous radially inward and outward flows in the workspace of the shear retort (radial counterflow). Conical as well as planar impellers are intended to be covered by the claims.

Figure 3:
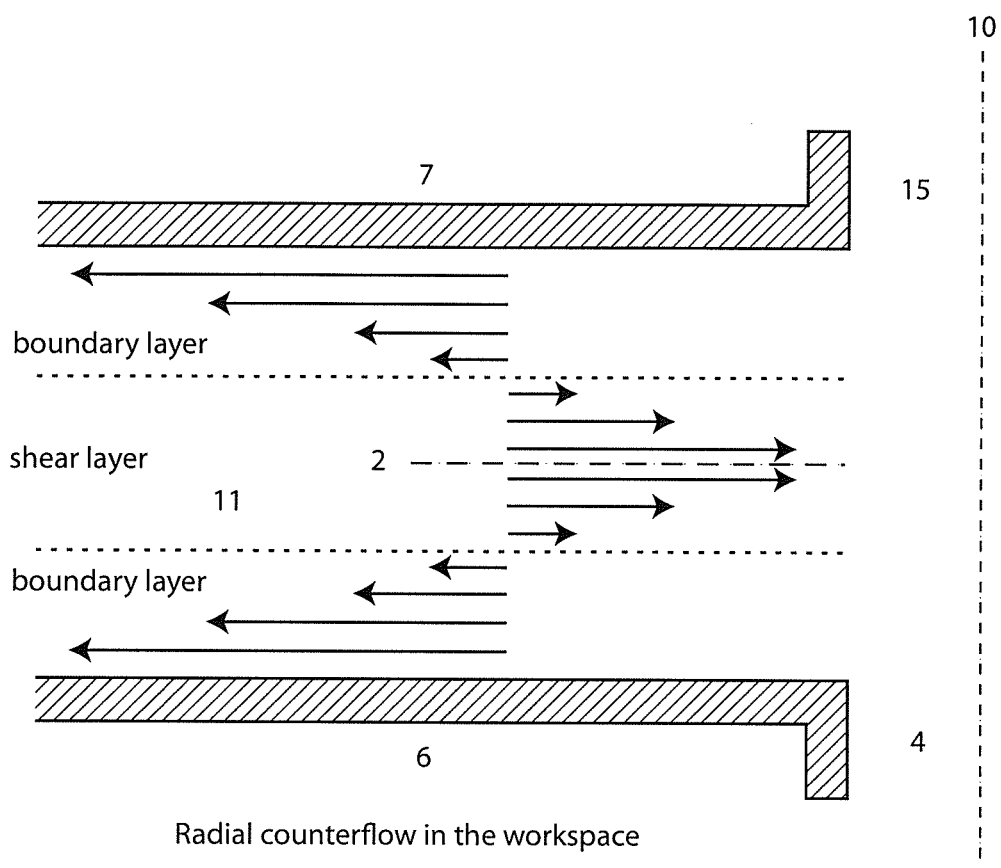
FIG. 3 shows a schematic view of radial counterflow in the workspace between the impellers.

FIG. 3 shows a detail of the radial counterflow in the workspace 11. Laminar boundary layers, where the momentum diffusion from the impellers 6, 7 into the tar sand feedstock occurs, set up against the impellers. Radially outward flow of feedstock and devolatilized solids is forced by momentum diffusion in the boundary layers.

A shear layer sets up between the counter-rotating laminar boundary layers. In the shear layer the water content of the feedstock is heated to steam and the bitumen is chipped off the solids and visbroken. The shear layer comprises radial vortices which act as a sink flow network, into which the gases, naphthas, and oils (the product stream from pyrolysis)—which are less dense than the solids—concentrate and proceed in sink flow to the axial exhaust port 15 which provides a path for the product stream out of the workspace.

Area-preserving fractal flow networks, such as the root system of trees, are Nature's way of organizing flow with a minimum of pressure drop, in a multi-scale path of least resistance. The open von Karman geometry of the present disclosure allows a fractal flow network in the shear layer. One radial vortex axis is shown as a dashed line 2. Low density fractions in the workspace 11, such as gases, naphthas, oils, and bitumen, concentrate in the shear layer, and solids are expelled by centrifugation out of the shear layer and into the boundary layers.

The arrows show the magnitude and direction of radial flows at various distances from the impellers, with respect to the axis 10 in the workspace 11. Solids recirculate in and out of the shear layer, bringing back heat from the periphery 12 where the solids are ground and the residual bitumen devolatilized in high shear.

Figure 4:
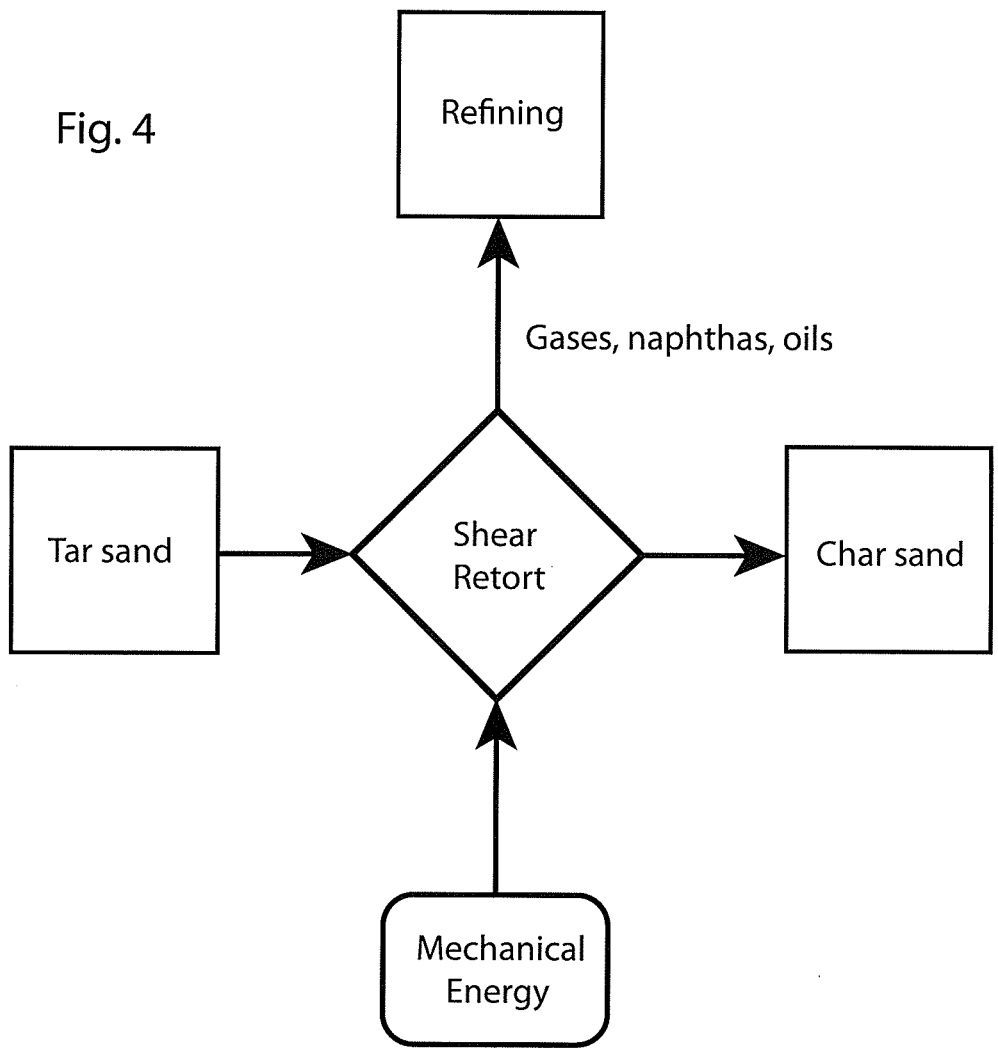
FIG. 4 shows a flow diagram of the continuous cataclastic separation process

FIG. 4 shows a flow diagram of the cataclastic upgrading process.

The energy input for extraction and visbreaking is provided by work, not by heat. This avoids the water waste, $CO_2$ emissions, and sludge pond blight resulting from the conventional hot water extraction process. Residual bitumen in the solids churned in this continuous process is thoroughly devolatilized to char or coke mixed with the residual solids, a mixture which may be called char sand.

Inoculation of char sand with appropriate mycorrhizal fungi would boost its effectiveness as a soil amendment. Mycorrhizal fungi are fungi that have developed a symbiotic relationship with the root systems of living plants. Networks of mycorrhizal filaments envelop the seedling's root structure, greatly extending and enhancing (by a factor of several hundred to several thousand times) the growing plant's water- and nutrient-gathering abilities and protecting the plant from disease.

Sand progressing radially outward through the shear retort accumulates heat due to the grains grinding together, and the frictional heat devolatilizes the bitumen. Tar sands already comprise a significant water fraction (5%), so minimal water from the environment need be withdrawn and a minimum of water is discharged in the process. The tailings pond problem and the waste of fresh water is solved by shear-heating in a continuous and low-tech process.

The process of the present disclosure and its implementing apparatus would scale well to large processing tasks, with large-diameter impellers being much more effective because the residence time varies as the square of the impeller radius. Massive and large-diameter impellers, which would have high rotational inertia, would serve as flywheels for mechanical energy storage and also act as heat sinks for storage of the frictional heat generated in the solids, to maintain process consistency with varying loads and to assure complete devolatilization of bitumen in a continuous process. The feedstock will be entering a reactor which is already hot from the accumulated heat from the shear heating of prior feed, and with high accumulated angular momentum which can overcome feedstock viscosity to force radial counterflow and simultaneous axial extraction of product and peripheral discharge of spent solids. Sufficient residence time for pyrolysis during the progression of the solids to the periphery assures a devolatilized residue of char sand.

Figure 5:
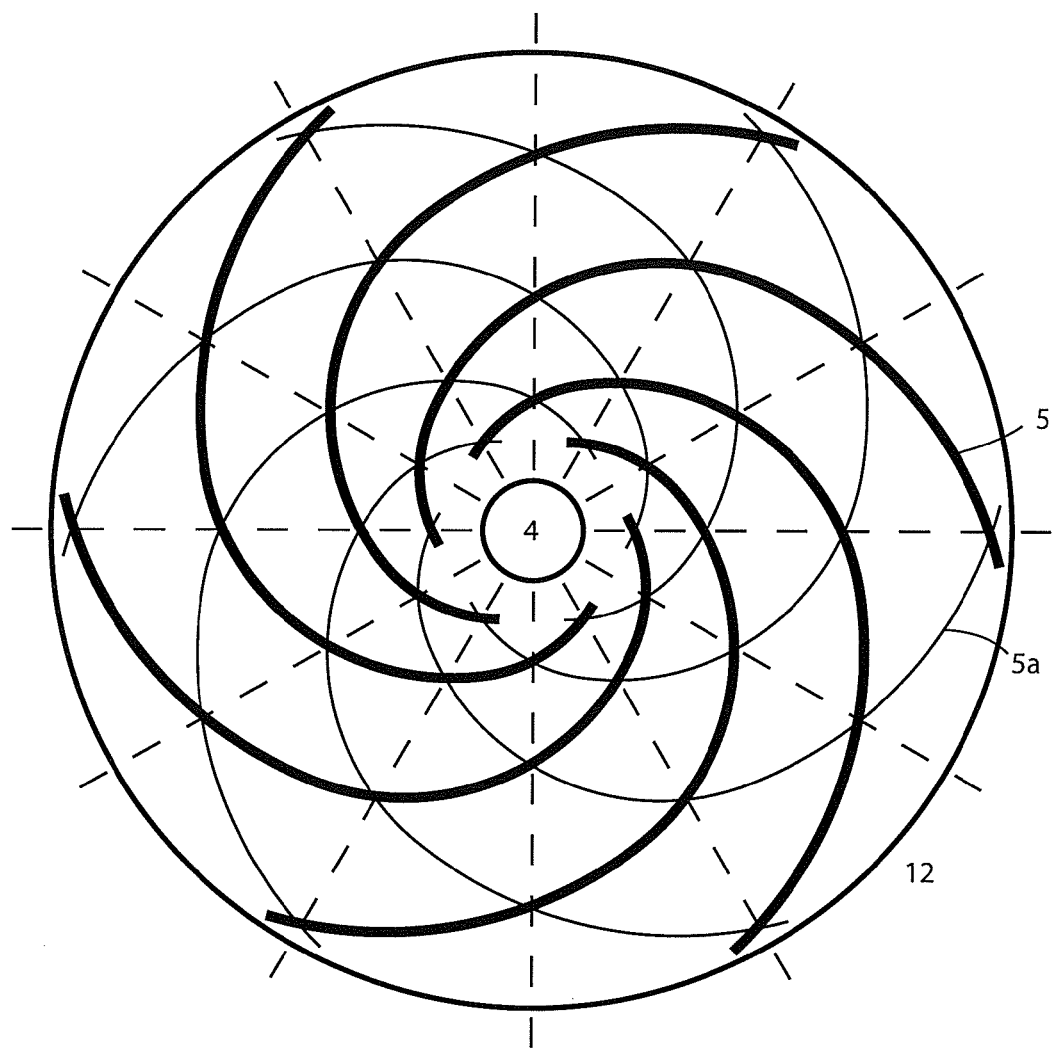
FIG. 5 shows the array of radial vanes on the top impeller scissoring the vanes on the bottom impeller.

FIG. 5 shows the scissoring radial vanes of the impellers. The impellers 6, 7 are shown in superposition, with 5 representing the vanes on one impeller, and 5a representing the vanes on the opposing impeller, which are here indicated using lighter weight lines. Each impeller comprises an array of radial vanes 5, 5a curving away from its direction of rotation, such that rotation advects feedstock and spent solids radially outward by both impellers simultaneously. In superposition, the radial vanes 5, 5a on the impellers intersect at shearing points which are in close opposition but not in contact with each other. These shearing points move out along radial lines (indicated by the dashed lines) as the impellers counter-rotate. These lines of high shear sustain the sink flow of the product stream by refreshing the radial vortices, and the periodic shear pulses cause peristaltic pumping of sink flow through the vortex cores.

The vortex-wall interaction as swirl collapses where the impellers pinch together as shown in FIG. 2 converts the radial vortices generated by the shearing impellers into axial jets driving a recirculation flow radially inward toward the axis 10. See Shtern and Hussain, "Collapse, Symmetry Breaking, and Hysteresis in Swirling Flows," *Ann. Rev. Fluid Mech.* 31:537-66 (1999), particularly FIG. 1 thereof. Shear-heated solids in the recirculation flow bring heat back into the feed, without any external combustion sand loop as in the prior art.

FIG. 6 shows a top view of the bottom impeller, and the arrangement of peripheral drive wheels and sleeper wheels. The prime mover 8 can be a motor or another source of motive power such as wind or hydro. The drive wheel 9 would preferably be a gear, and the drive track 17 would be a gear track. Sleeper wheels 14 which are free-wheeling, or which may be connected to loads, act with the peripheral drive wheel 9 to maintain parallel alignment and exact separation of the impellers. The axial feed port 4 centered in the bottom impeller 6 introduces tar sand into the cataclastic shear retort, which is churned and ultimately extruded through the periphery 12 as char sand. Char sand collection funnels 18 disposed between the wheels 9, 14 and scraping the impellers channel the extruded char sand away from the wheels and into suitable means for char sand collection 19.

Spent solids collected through the funnels 18 or by other suitable means from the periphery 12 may be useful for building materials with further processing. For example, spent solids from oil shale comminuted and cracked in the cataclastic shear retort would be dry, hot and fluid so they might be processed into bricks by further heating and compression.

Application of the apparatus and process of the present disclosure could be in situ, at the point of tar sand excavation, or ex situ, for example at a sludge pond or at a mine site. Dewatering of the sludge ponds, to remove the gravy-like suspended solids and shear-thicken them into a clay, would preferably be accomplished by a device along the lines shown in McCutchen, U.S. Pat. No. 7,757,866 (2010). The peripherally extruded dewatered solids from said device could be fed to a shear reactor according to the present disclosure for shear heating into devolatilized solids having parallel clay platelet alignment. In this way, bricks from the sludge pond dewatering could be used to form retaining walls, and the char sand from the cataclastic shear retort could fill in berms behind the retaining walls. A labyrinthine network of clean canals between such extremely fertile berms would transform the sludge ponds into a paradise for migrating waterfowl.

Coal tailings, including coal ash, could be processed to reduce water content by shear heating so as to produce a hot and dry sludge suitable for pressing into "green bricks."

The gearbox problems of wind turbines would be avoided by coupling them to a high torque application such as driving the peripheral drive wheels of the shear retort, just as windmills have driven pumps and grain mills for centuries. The flywheel energy storage of the counter-rotating double disk mill of the present disclosure compensates for the intermittency of wind power, so even if the wind is not blowing, the tar sand processing can continue at the site of excavation to produce a steady stream of products going to a pipeline and devolatilized and dry solids suitable for discharge into the environment, with minimal carbon dioxide emissions.

By minimizing the $CO_2$ emissions and wastewater from tar sands or oil shale processing, new energy resources could be exploited without damaging the environment where they are produced.

This disclosure can also be applied to the refining of other type of ore having a high mineral burden, such as metal ores, especially precious metals such as gold and silver. A solvent can be introduced into the feedstock, where the grinding and crushing in the shear retort exposes more surfaces to the solvent and the heat can also improve its chemical action. In this case, a baffle between the feed port 4 and the exhaust port 15 will prevent unused solvent from exiting the retort prematurely without going through the workspace 11. Preferably, the solvent would be introduced in a more viscous form in the feedstock, and its dissolution of the metal therein would make it less viscous, and therefore more easily extracted in the sink flow, leaving the waste mineral content to be extruded at the periphery 12.

While the embodiments of the present invention have been particularly shown and described above, it will be understood by one of ordinary skill in the art that various changes in form and details may be made therein without departing from the spirit and scope of the present invention as defined by the following claims.

We claim:

1. Apparatus for continuous processing to extract a product stream from a feedstock comprising unconventional oil source materials, the apparatus comprising:
opposed centrifugal impellers having a common axis of rotation and spaced apart so as to define a radial workspace between them, the workspace extending from said axis of rotation to a periphery,
one of said impellers comprising a central axial feed port for introducing the feedstock into the workspace, and the other impeller comprising a central axial exhaust port for extracting the product stream from the workspace;
a prime mover connected to the impellers so as to cause their counter-rotation about said axis of rotation;
means for introducing the feedstock into the workspace through the axial feed port as the impellers counter-rotate; and
means for collecting solids extruded from the periphery.

2. The apparatus of claim 1, wherein said prime mover connects to the impellers by at least one peripheral drive wheel.

3. The apparatus of claim 1, further comprising an axial exhaust pump which communicates with the workspace through the axial exhaust port.

4. The apparatus of claim 1, wherein the prime mover comprises a wind turbine.

5. The apparatus of claim 1, wherein at least one impeller has a conical surface.

6. Apparatus for devolatilizing residue from extraction of oil from unconventional oil source materials so as to produce a mixture of minerals and coke, the apparatus comprising:
opposed centrifugal impellers having a common axis of rotation and spaced apart so as to define a radial workspace between them, the workspace extending from said axis of rotation to a periphery,
one of said impellers comprising a central axial feed port for introducing the feedstock into the workspace, and the other impeller comprising a central axial exhaust port for extracting liquids and gases from the workspace;
a prime mover connected to the impellers so as to cause their counter-rotation about said axis of rotation;

means for introducing said residue into the workspace through the axial feed port as the impellers counter-rotate; and means for collecting said mixture of minerals and coke extruded from the periphery.

7. The apparatus of claim 6, wherein said prime mover connects to the impellers by at least one peripheral drive wheel.

8. The apparatus of claim 6, wherein the prime mover comprises a wind turbine.

9. An apparatus for processing ore by continuous comminution and shear heating, the apparatus comprising:

opposed centrifugal impellers having a common axis of rotation and spaced apart so as to define a radial workspace between them, the workspace extending from said axis of rotation to a periphery,
one of said impellers comprising a central axial feed port for introducing the feedstock into the workspace, and
the other impeller comprising a central axial exhaust port for extracting liquids and gases from the workspace;

a prime mover connected to the impellers so as to cause their counter-rotation about said axis of rotation;

means for introducing the ore into the workspace through the axial feed port as the impellers counter-rotate; and means for collecting the processed ore that is extruded from the periphery.

10. The apparatus of claim 9, wherein said prime mover connects to the impellers by at least one peripheral drive wheel.

11. The apparatus of claim 9, wherein the ore comprises a solvent.

\* \* \* \* \*